J. H. MELICK.
HORSE-RAKE.

No. 177,870. Patented May 23, 1876.

Witnesses:

James H. Melick
his Attorney
Alex. Selkirk
Inventor.

2 Sheets—Sheet 2.

J. H. MELICK.
HORSE-RAKE.

No. 177,870. Patented May 23, 1876.

UNITED STATES PATENT OFFICE.

JAMES H. MELICK, OF ALBANY, NEW YORK, ASSIGNOR TO WHEELER, MELICK & CO., OF SAME PLACE.

IMPROVEMENT IN HORSE-RAKES.

Specification forming part of Letters Patent No. 177,870, dated May 23, 1876; application filed October 18, 1875.

*To all whom it may concern:*

Be it known that I, JAMES H. MELICK, of the city and county of Albany, State of New York, have invented certain Improvements in Horse Hay-Rakes; and I do hereby declare that the following is a description thereof, reference being had to the accompanying drawings, forming a part of this specification, in two sheets, in which—

Figure 1:
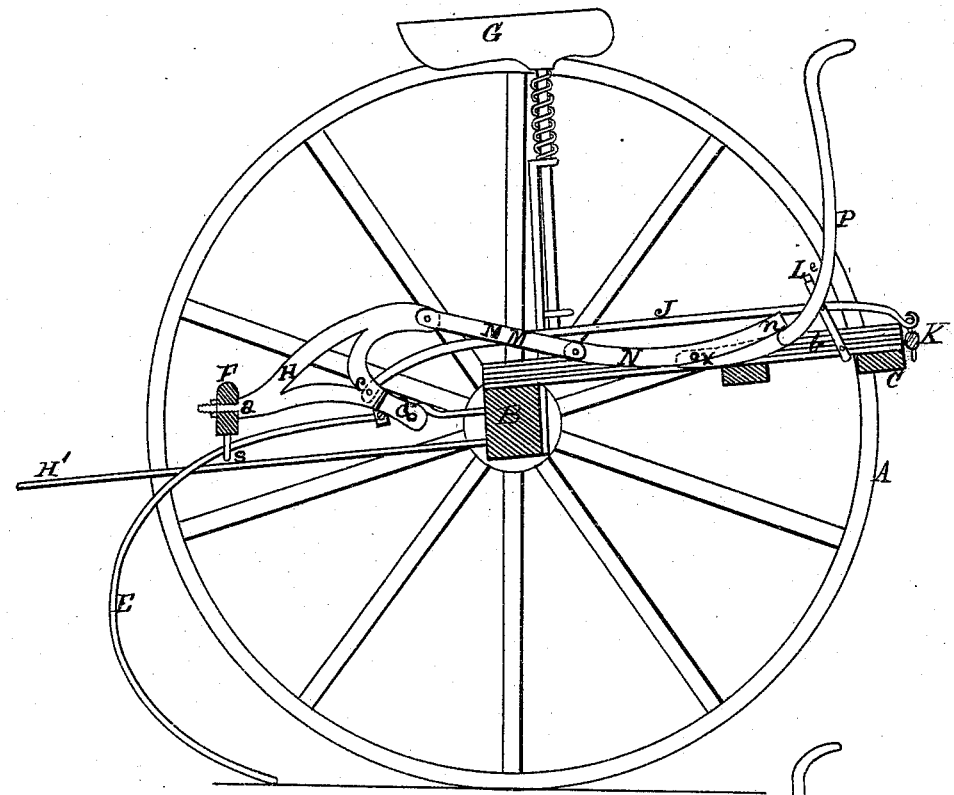
Figure 2:
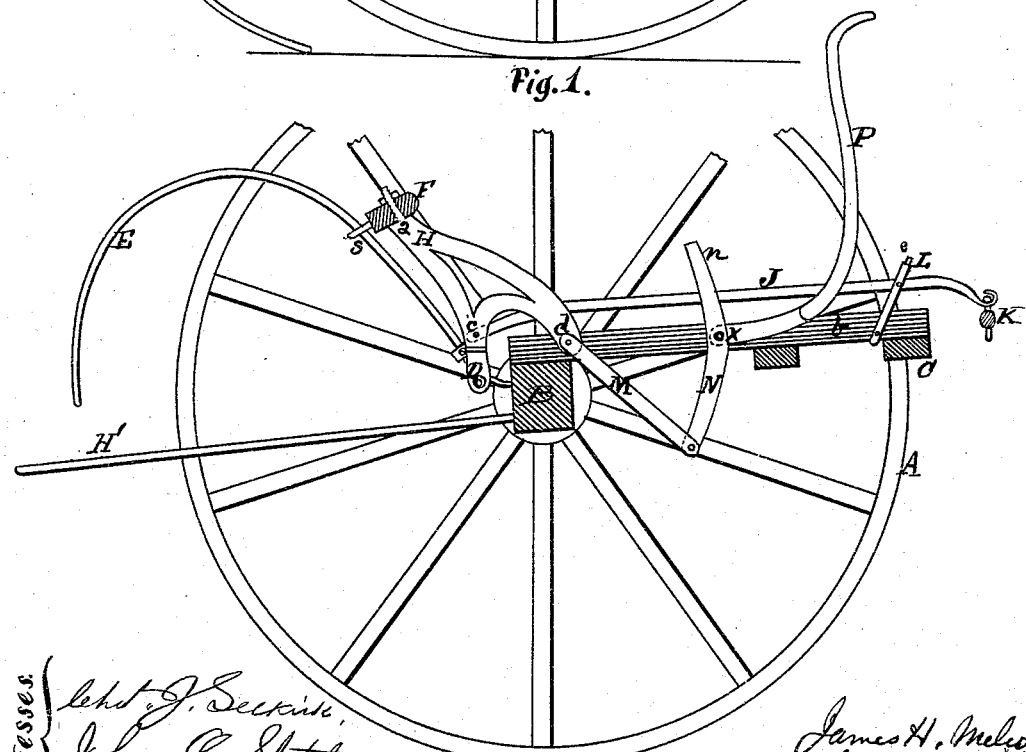
Figure 3:
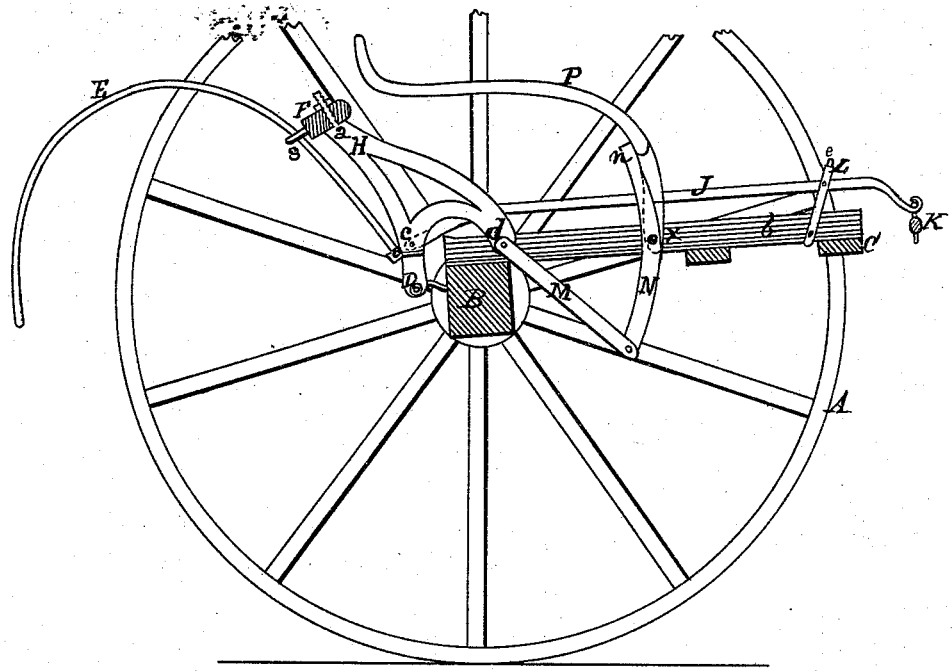
Figure 4:
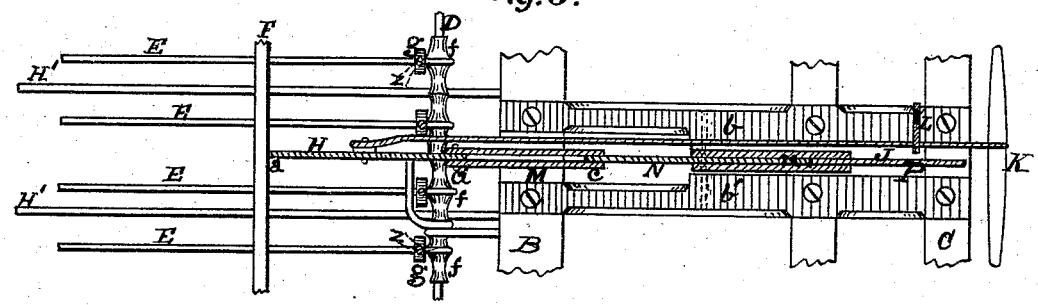
Figure 5:
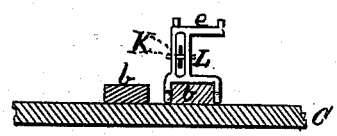

Figure 1, Sheet 1, represents a sectional elevation of the hay-rake embodying the improvements in this invention, with all the parts in position for the raking of hay. Fig. 2, Sheet 1, represents a sectional elevation of the rake when the parts are in position for dumping by the draft of the horse. Fig. 3, Sheet 2, represents a sectional elevation of the rake when the parts are operated for raising the teeth by hand. Fig. 4, Sheet 2, is a plan view of the working parts of the rake. Fig. 5, Sheet 2, is a sectional view of the foot-lever.

My invention relates to certain improvements in horse hay-rakes, whereby the several fingers may be readily raised by the draft of the horse, or by the hand or foot of the driver, and also whereby the fingers may be readily removed or attached; and consists in the several devices and combinations of parts hereinafter described.

The object of this invention is to render the rake capable of being dumped by the animal drawing the same, or by the hand or foot of the driver, or, in heavy hay, by the aid of both the animal and the driver, and also to enable a farmer to readily replace a broken finger with a new one in a moment of time.

To enable others skilled in the art to make and use my invention, I will proceed to describe it in reference to the drawings and the letters of reference marked thereon, the same letters indicating like parts.

In the drawings, A A represent the wheels; B is the axle; C, the shaft-bar; D is the thimble-rod, to which the fingers E are attached; F is the staple-bar for lifting the fingers; G is the seat; H' H' are the clearing-bars—all of which are old and well known. With the thimble-rod D is pivoted the staple-bar lever H, the thimble-rod acting as a pivot. One end $a$ of said lever is firmly secured to the staple-bar F, which lifts the fingers E. Pivoted to the staple-bar lever H, at a low point near the thimble-bar, as at $c$, is the draw-bar J, to the opposite end of which is attached the whiffletree K. Pivoted to the bar $b$, running from the cross-bar of the shafts back to the axle, is the foot-lever L, which is also pivoted to the draw-bar at a point about midway between the bar $b$ and the stirrup or foot $e$, made on the upper end of the said foot-lever. Pivoted to the limb $d$ of the staple-bar lever H is the draw-bar M, which draw-bar is pivoted at its opposite end to the lever N. The lever N is pivoted to the bars $b$ $b'$ at about its center, and its free end $n$ is so shaped as to ride on the base of the hand-lever P above its pivot, which hand-lever is pivoted to the bars $b$ $b'$ from the pivot $x$, to which the lever N is pivoted. The fingers E are attached to the thimble-rod D by the half-thimbles $f$, to which the end of the fingers are secured by its being made to clasp or gripe the same. A set-washer, $g$, fitting the finger, and provided with a set-screw, $z$, is slipped over the finger toward the half-thimble $f$. When the half-thimble, with its attached finger, is hooked on the thimble-rod, the set-washer is shoved up to the said thimble-rod, and secured in place by the set-screw $z$. The finger is then secured to the thimble-rod in a reliable manner, so as to allow the finger to be moved or turned on the same, like as when a full thimble is employed.

The manner in which the several parts of this invention operate is as follows: The draft of the rake is applied to the whiffletree K. The operator, sitting on his seat with his foot on foot-lever L, as in Fig. 1, holds the said foot-lever in position, as shown in said figure, when the several fingers will be locked down for operation with the hay scattered on the surface of the ground, to gather the same and hold it in the concavity of the fingers. The foot of the operator, pressing on the free end $n$ of the lever N, will also lock down the said fingers.

When a sufficient quantity of hay has been raked to form a windrow, the operator relieves the foot-lever L from the pressure of his foot, when the draft of the animal on the draw-bar J, communicated through the whiffletree, will pull the draw-bar J forward. The said draw-bar, being connected with the staple-bar lever H rolling on the thimble-rod D, will throw the same up, when the fingers E, secured to the staple-bar by the staples s, will also be thrown up, the several parts assuming the position shown in full lines in Fig. 2.

When the operator employs the free end n of the lever N to lock the fingers down to the ground, a removal of the pressure of his foot from the same will also permit the draft of the animal to lift the fingers, substantially in the manner above described.

When the operator desires to suddenly raise the fingers to clear a stump or any other obstruction, he will grasp the hand-lever P, and throw it from position shown in Fig. 1 to that shown in Fig. 3, when the said lever will throw the free end n of the lever N from the position in Fig. 1 to that in Fig. 3, while the draw J will be drawn forward, and carry forward the foot-lever L, which, when held forward, will lock the fingers in a thrown-up position.

It will be observed, while the hand-lever P is pivoted between the bars b b', and is capable of operating with the lever N to move the other parts of the rake, that said lever N is not made continuous with said hand-lever, but only rides with its free end n on the lower end of the said hand-lever, so that when the said hand-lever is thrown back the lever N will be as effectually operated as if the said levers were made connected or continuous with each other.

It will also be observed that, when the operator's foot is removed from the foot-lever L, when all the parts are in position shown in Fig. 1, and the animal pulls on the draw-bar M to raise the several fingers to position shown in Fig. 2, the free end n of the lever N will be thrown back from riding on the lower end of the hand-lever P, while the said hand-lever will remain in the same position as before such throwing up of the fingers. It is therefore readily seen that all liability of the hand-lever P being thrown back suddenly and violently to endanger the knee or leg of the operator by a blow from the said hand-lever is entirely obviated, and accidents occurring from a sudden throwing back of the said hand-lever as heretofore constructed in a connected manner with the lever N are wholly prevented.

The attachment of the fingers to thimble-rod D by means of the half-thimble f and the set-washer g, with its set-screw z, enables the farmer to readily replace a broken finger with a new duplicate one in a moment of time, without necessitating the removal of all the fingers between such broken finger and an end of the thimble-rod, and also such adjunct attachments that would need to be removed, as now required with fingers, as heretofore attached.

These improvements render the rake capable of being under the direct control of the operator, and remove all liability of accident, while the animal drawing the rake is made to dump the same at the discretion of the operator.

Having described my invention, what I claim, and desire to secure by Letters Patent, is—

1. The combination, with the lever N, pivoted to bar b, of the hand-lever P, operating with the free end n of lever N, for operation with the adjuncts employed to raise the fingers E E, substantially as set forth.

2. The pivoted foot-lever L, capable of being moved in either direction, in combination with the draft-bar J, operating with the adjuncts employed to raise the fingers, substantially as and for the purpose set forth.

3. The staple-bar F, holding the fingers, pivoted staple-bar lever H, draft-bar J, and foot-lever L, when combined to operate substantially as described.

4. The half-thimble f, with the finger E attached thereto, and the set-washer g, provided with a set-screw, substantially as and for the purpose described.

JAMES H. MELICK.

Witnesses:
JOHN A. BURNAP,
ALEX. SELKIRK.